US008045981B2

(12) United States Patent
Umatt et al.

(10) Patent No.: US 8,045,981 B2
(45) Date of Patent: Oct. 25, 2011

(54) SYSTEM SEARCH TO DETECT FOR A WIRELESS COMMUNICATION NETWORK IN A CROWDED FREQUENCY BAND

(75) Inventors: Bhupesh Manoharlal Umatt, San Diego, CA (US); Messay Amerga, San Diego, CA (US); Vineet Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 11/283,115

(22) Filed: Nov. 17, 2005

(65) Prior Publication Data
US 2007/0042775 A1    Feb. 22, 2007

Related U.S. Application Data

(60) Provisional application No. 60/709,644, filed on Aug. 18, 2005, provisional application No. 60/713,507, filed on Aug. 31, 2005.

(51) Int. Cl.
*H04W 4/00* (2009.01)

(52) U.S. Cl. ............... 455/434; 455/456.1; 455/436; 455/552; 455/426; 455/435.2; 455/450; 455/464

(58) Field of Classification Search .......... 455/513, 455/450, 452.1, 456.1, 414.1, 436, 432.1, 455/434, 552, 426, 435.2, 464
See application file for complete search history.

(56) References Cited

U.S. PATENT DOCUMENTS

| | | | | |
|---|---|---|---|---|
| 4,905,301 A | * | 2/1990 | Krolopp et al. | 455/434 |
| 5,095,530 A | * | 3/1992 | Tanaka et al. | 455/422.1 |
| 5,119,502 A | * | 6/1992 | Kallin et al. | 455/434 |
| 5,457,816 A | * | 10/1995 | Koyama | 455/161.2 |
| 5,517,673 A | * | 5/1996 | Fehnel | 455/434 |
| 5,809,419 A | * | 9/1998 | Schellinger et al. | 455/434 |

(Continued)

FOREIGN PATENT DOCUMENTS

CN         1138813         12/1996

(Continued)

OTHER PUBLICATIONS

International Search Report and Written Opinion—PCT/US2006/032370, International Search Authority—European Patent Office—Mar. 16, 2007.

(Continued)

*Primary Examiner* — Kwasi Karikari
(74) *Attorney, Agent, or Firm* — Timothy F. Loomis; Won Tae Kim

(57) ABSTRACT

Techniques for efficiently performing system search to obtain service from a wireless system as quickly as possible are described. A terminal initially looks for service from a first (e.g., W-CDMA) system. The terminal identifies network(s) in the first system from which service was received in the past and performs acquisition on each network to look for service. If service is not found for the first system, then the terminal performs a search for a second (e.g., GSM) system. If service is found on the second system, then the terminal obtains service from the second system and avoids a frequency scan for the first system. Otherwise, the terminal performs a frequency scan for the first system using the search results for the second system. The terminal may obtain a list of RF channels detected for the second system and may omit these RF channels and possibly some other RF channels around these RF channels from the frequency scan.

35 Claims, 8 Drawing Sheets

U.S. PATENT DOCUMENTS

| | | | | |
|---|---|---|---|---|
| 5,862,480 A * | 1/1999 | Wild et al. | ............... | 455/432.2 |
| 6,016,427 A * | 1/2000 | Barber et al. | ............... | 455/434 |
| 6,052,590 A * | 4/2000 | Hicks et al. | ............... | 455/434 |
| 6,148,203 A * | 11/2000 | Renko et al. | ............... | 455/434 |
| 6,275,699 B1 * | 8/2001 | Ichihara | ............... | 455/434 |
| 6,337,982 B2 * | 1/2002 | Auffray | ............... | 455/434 |
| 6,393,006 B1 * | 5/2002 | Kajihara | ............... | 370/335 |
| 6,400,948 B1 * | 6/2002 | Hardin | ............... | 455/434 |
| 6,400,961 B1 | 6/2002 | Lillie et al. | | |
| 6,480,709 B2 * | 11/2002 | Phang et al. | ............... | 455/260 |
| 6,615,043 B1 * | 9/2003 | van de Berg | ............... | 455/434 |
| 6,687,285 B1 * | 2/2004 | Jou | ............... | 375/133 |
| 6,778,827 B1 * | 8/2004 | Anderson et al. | ............... | 455/434 |
| 6,810,026 B1 * | 10/2004 | Huttunen | ............... | 370/310 |
| 6,985,733 B2 * | 1/2006 | Binzel | ............... | 455/437 |
| 7,013,140 B2 * | 3/2006 | Ostberg et al. | ............... | 455/434 |
| 7,139,587 B2 * | 11/2006 | Ishii | ............... | 455/552.1 |
| 7,187,943 B1 * | 3/2007 | Lee | ............... | 455/525 |
| 7,263,078 B2 * | 8/2007 | Krantz et al. | ............... | 370/328 |
| 7,299,053 B2 * | 11/2007 | Tajiri et al. | ............... | 455/455 |
| 7,610,057 B2 * | 10/2009 | Bahl et al. | ............... | 455/522 |
| 2003/0054809 A1 * | 3/2003 | Bridges et al. | ............... | 455/419 |
| 2004/0203893 A1 * | 10/2004 | Kotzin | ............... | 455/456.1 |
| 2005/0025182 A1 * | 2/2005 | Nazari | ............... | 370/469 |
| 2005/0288015 A1 * | 12/2005 | Azizi et al. | ............... | 455/434 |

FOREIGN PATENT DOCUMENTS

| | | |
|---|---|---|
| JP | 2004215259 | 7/2004 |
| JP | 2004297784 | 10/2004 |
| WO | WO2004102927 | 11/2004 |

OTHER PUBLICATIONS

Translation of Office Action in chinese application 200680038137.X corresponding to U.S. Appl. No. 11/283,115, citing US20040203893 and CN1138813 dated Jan. 19, 2001.

* cited by examiner

SYSTEM SEARCH TO DETECT FOR A WIRELESS COMMUNICATION NETWORK IN A CROWDED FREQUENCY BAND

The present application claims priority to provisional U.S. Application Ser. No. 60/709,644, entitled "FREQUENCY SCAN OPTIMIZATIONS FOR CROWDED BANDS OF SERVICE," filed Aug. 18, 2005; and U.S. Application Ser. No. 60/713,507, entitled "SERVICE REQUEST PROCEDURE DESCRIPTION AND CHANGES REQUIRED TO SPEED UP ENTRY INTO SERVICE," filed Aug. 31, 2005. assigned to the assignee hereof and incorporated herein by reference.

BACKGROUND

I. Field

The present disclosure relates generally to communication, and more specifically to techniques for performing system search to detect for a wireless communication network.

II. Background

Wireless communication networks are widely deployed to provide various communication services such as voice, packet data, broadcast, messaging, and so on. These wireless networks may be capable of supporting communication for multiple users by sharing the available network resources. Examples of such wireless networks include Code Division Multiple Access (CDMA) networks, Time Division Multiple Access (TDMA) networks, and Frequency Division Multiple Access (FDMA) networks. These wireless networks may utilize various radio access technologies (RATs) such as Wideband-CDMA (W-CDMA), cdma2000, Global System for Mobile Communications (GSM), and so on, which are known in the art.

A terminal may be capable of communicating with different wireless networks such as W-CDMA and GSM networks. The terminal typically performs system search upon being powered on in order to detect for a wireless network from which the terminal can obtain service. System search entails performing search and acquisition, as necessary, to obtain service from a wireless network. For the system search, the terminal may first attempt to acquire one of the wireless networks from which the terminal has obtained service in the past. If the acquisition is unsuccessful, then the terminal may perform a frequency scan across a frequency band in order to find a wireless network from which the terminal can obtain service. Frequency scan may entail attempting acquisition on each frequency in which a wireless network may operate. Since there may be many frequencies in a given frequency band, the frequency scan may be very time consuming, e.g., on the order of minutes for a crowded frequency band on which many wireless networks may be operating. The long frequency scan causes long delay in obtaining service, which is highly undesirable.

There is therefore a need in the art for techniques to efficiently perform system search in order to obtain service faster.

SUMMARY

Techniques for efficiently performing system search to obtain service from a wireless communication system as quickly as possible are described herein. A terminal may be capable of receiving service from one of multiple systems, e.g., two systems such as W-CDMA and GSM systems. A first system (e.g., W-CDMA) may be preferred over a second system (e.g., GSM). Nevertheless, it is desirable to obtain service from any system (e.g., either W-CDMA or GSM) as quickly as possible. A frequency scan for the preferred system may take a long time. The techniques described herein attempt to obtain service from any system before performing a frequency scan for the first system. Furthermore, the frequency scan for the first system is performed using information for the second system, so that frequency regions in which the first system is unlikely to be found are not scanned. This limited frequency scan may substantially reduce scan time.

In an embodiment, the terminal initially looks for service from the first system. The terminal may form a list of one or more networks in the first system, which may be network(s) from which the terminal has received service in the past. The terminal may perform acquisition on each network in the list to look for service from the first system. If service is not found for the first system, then the terminal performs a search for the second system. If service is found on the second system, then the terminal obtains service from the second system and avoids a frequency scan for the first system. Otherwise, the terminal performs a frequency scan for the first system using the search results for the second system. The terminal may obtain a list of radio frequency (RF) channels detected for the second system and may omit these RF channels and possibly some other RF channels around these RF channels from the frequency scan for the first system.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The system search techniques described herein may be used for various wireless communication systems such as W-CDMA, GSM, and cdma2000 systems. A system is characterized by a particular radio access technology (RAT) such as W-CDMA, GSM, cdma2000, or some other RAT. A system may include any number of networks. A network operator/service provider may deploy one or more systems for one or more RATs. For clarity, the system search techniques are described below for W-CDMA and GSM.

Figure 1:
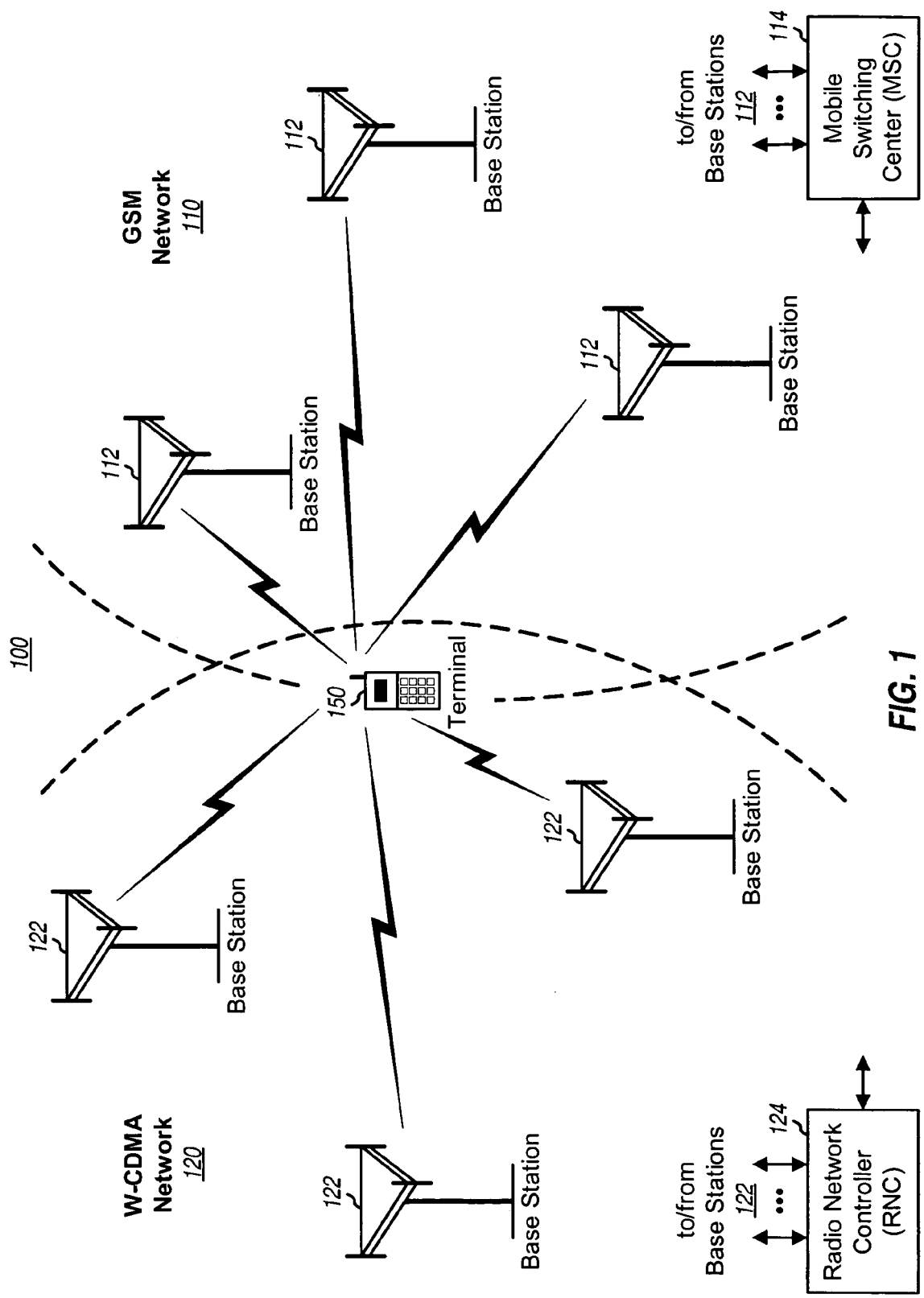
FIG. 1 shows a GSM network and a W-CDMA network.

FIG. 1 shows a deployment 100 that includes a GSM network 110 and a W-CDMA network 120. GSM is a second generation (2G) radio access technology that can provide voice service and low to medium rate packet data service. W-CDMA is a third generation (3G) radio access technology that can provide enhanced services and capabilities, e.g., higher data rates, concurrent voice and data calls, and so on. GSM network 110 and W-CDMA network 120 may be part of a Universal Mobile Telecommunication System (UMTS) network. GSM and W-CDMA are described in documents from a consortium named "3rd Generation Partnership Project" (3GPP), which are publicly available.

GSM network 110 includes base stations 112 that communicate with terminals within the coverage area of the GSM network. A base station is a fixed station that communicates with the terminals and may also be called a Node B, a base transceiver station (BTS), an access point, and so on. A mobile switching center (MSC) 114 couples to base stations 112 and provides coordination and control for these base stations. W-CDMA network 120 includes base stations 122 that communicate with terminals within the coverage area of the W-CDMA network. A radio network controller (RNC) 124 couples to base stations 122 and provides coordination and control for these base stations. RNC 124 may communicate with MSC 114 to support inter-working between the W-CDMA and GSM networks. A wireless network typically includes many cells, where the term "cell" can refer to a base station or the coverage area of the base station, depending on the context in which the term is used. In the following description, base station 112 is also referred to as a GSM cell, and base station 122 is also referred to as a W-CDMA cell.

A multi-mode terminal 150 (e.g., a dual-mode cellular phone) can communicate with GSM network 110 and W-CDMA network 120, typically with one wireless network at any given moment. This capability allows a user to obtain the performance advantages of W-CDMA and the coverage benefits of GSM with the same terminal. Terminal 150 may be fixed or mobile and may also be called a user equipment (UE), a mobile station (MS), a mobile equipment (ME), and so on. Terminal 150 may be a cellular phone, a personal digital assistant (PDA), a wireless modem, a wireless communication device, a subscriber unit, and so on.

GSM network 110 and W-CDMA network 120 may belong in the same or different public land mobile networks (PLMNs). A PLMN may comprise one or more wireless networks, e.g., one or more W-CDMA networks and/or one or more GSM networks. A PLMN is uniquely identified by a specific Mobile Country Code (MCC) and a specific Mobile Network Code (MNC). The W-CDMA networks and GSM networks for a given PLMN may have overlapping or non-overlapping coverage areas. Multiple PLMNs may also be deployed by different service providers in a given geographic area.

Terminal 150 may be provisioned with a list of preferred PLMNs from which the terminal may receive service. This preferred list may be provisioned by a service provider with which the terminal has a subscription. The preferred list normally includes a home PLMN (HPLMN) and other PLMNs for which the service provider has roaming agreements. The preferred list may be stored in a Subscriber Identity Module (SIM), a Universal SIM (USIM), or some other non-volatile memory module. The terminal may also maintain a list of available PLMNs, which are PLMNs that the terminal has discovered during prior system searches. The list of available PLMNs may be stored in a non-volatile memory.

A PLMN may operate on one or multiple frequency bands. Each wireless network within each PLMN typically operates at one or more specific frequencies within a specific frequency band. Table 1 lists frequency bands that are commonly used for W-CDMA and GSM networks.

TABLE 1

| Frequency Band | Uplink (MHz) | Downlink (MHz) | Common Name |
|---|---|---|---|
| W-CDMA Band I | 1920-1980 | 2110-2170 | IMT-2000 |
| W-CDMA Band II | 1850-1910 | 1930-1990 | PCS |
| W-CDMA Band III | 1710-1785 | 1805-1880 | DCS |
| W-CDMA Band IV | 1710-1770 | 2110-2170 | |
| W-CDMA Band V | 824-849 | 869-894 | Cellular |
| W-CDMA Band VI | 830-840 | 875-885 | |
| GSM 1900 | 1850-1910 | 1930-1990 | PCS |
| GSM 1800 | 1710-1785 | 1805-1880 | DCS |
| GSM 900 | 890-915 | 935-960 | |

A W-CDMA network may operate on any of the frequency bands given in Table 1 or some other frequency band, which are collectively called W-CDMA bands. Each W-CDMA band may be partitioned into multiple W-CDMA channels, with each W-CDMA channel having a bandwidth of 5 MHz. The center frequencies of the W-CDMA channels may be at discrete frequencies that are separated by 200 KHz. The W-CDMA channels are thus separated by 5 MHz and have center frequencies that can be chosen with 200 KHz resolution. Each W-CDMA channel is identified by a specific channel number, which may be an ARFCN (absolute radio frequency channel number) or a UARFCN (UTRA ARFCN). A W-CDMA network typically operates on a specific channel number, which is a specific carrier frequency within a specific W-CDMA band.

A GSM network may operate on any of the frequency bands given in Table 1 or some other frequency band, which are collectively called GSM bands. Each GSM band is partitioned into a number of 200 KHz RF channels. Each RF channel is identified by a specific ARFCN. The GSM 900 band covers ARFCNs of 1 through 124, the GSM 1800 band covers ARFCNs of 512 to 885, and the GSM 1900 band covers ARFCNs of 512 to 810. A GSM network typically operates on a specific set of RF channels in a specific GSM band.

As shown in Table 1, W-CDMA and GSM networks may operate on the same frequency band or overlapping frequency bands. For example, W-CDMA Band II and GSM 1900 band correspond to a Personal Communication System (PCS) band, and W-CDMA Band III and GSM 1800 band correspond to a Digital Cellular System (DCS) band. The operation of multiple wireless networks on the same or overlapping frequency bands can complicate frequency scan for W-CDMA, as described below.

Figure 2:
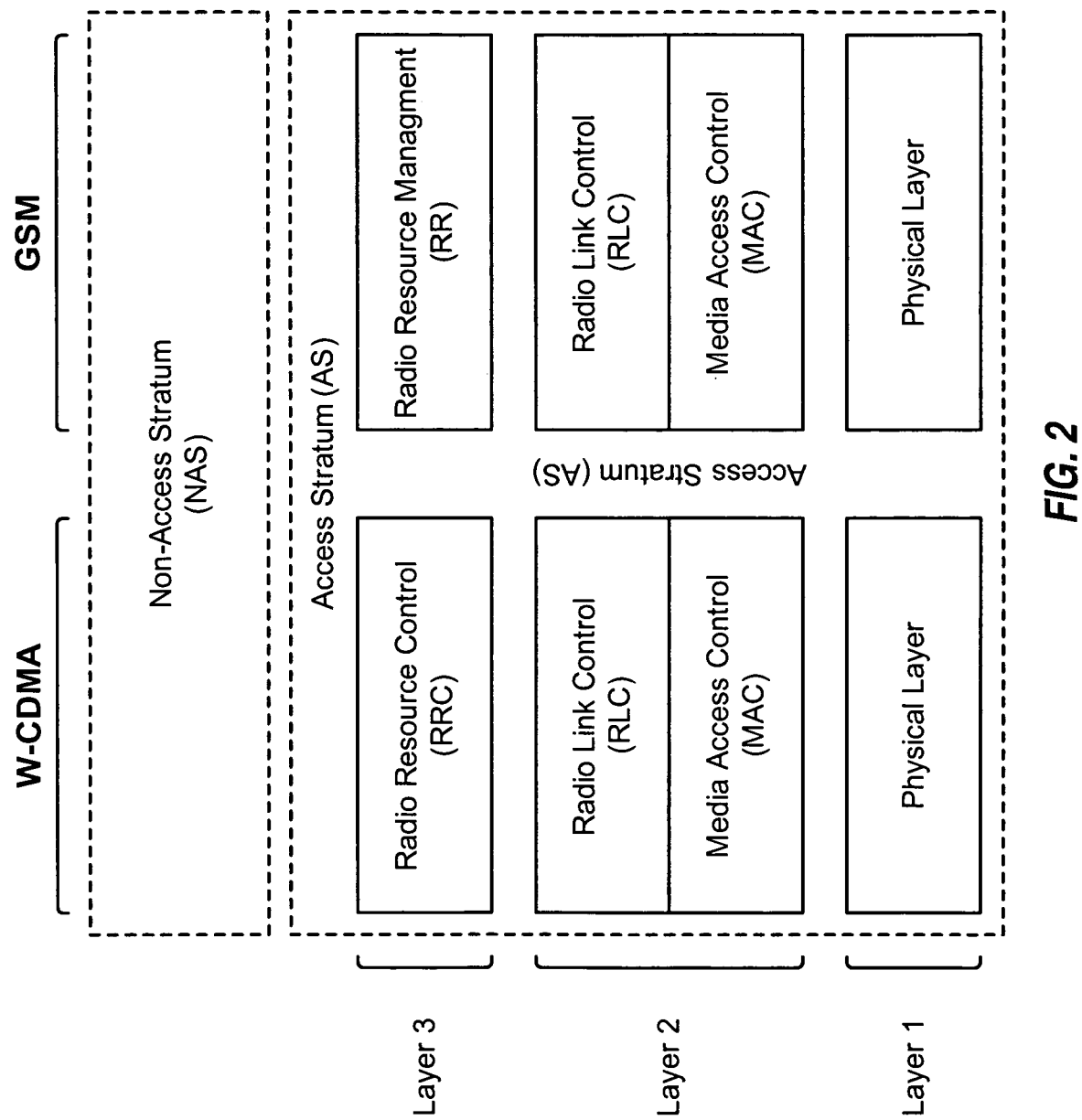
FIG. 2 shows various layers for W-CDMA and GSM.

FIG. 2 shows various layers for W-CDMA and GSM. W-CDMA includes a Non Access Stratum (NAS) and an Access Stratum (AS). The NAS comprises functions and protocols that support traffic and signaling between a terminal and a core network with which a W-CDMA network interfaces. The AS comprises functions and protocols that support communication between the terminal and an RNC within the W-CDMA network. For W-CDMA, the AS includes a Radio Resource Control (RRC) sublayer, a Radio Link Control (RLC) sublayer, a Medium Access Control (MAC) sublayer, and a physical layer. The RRC is a sublayer of Layer 3. The RLC and MAC are sublayers of Layer 2, which is also called a data link layer. The physical layer is also referred to as Layer 1.

GSM similarly includes the NAS and AS. For GSM, the AS includes a Radio Resource (RR) management sublayer at Layer 3, RLC and MAC sublayers at Layer 2, and a physical layer at Layer 1.

The NAS, RRC and RR perform various functions to search for wireless networks, to establish, maintain and terminate calls, and so on. For simplicity, only functions related to system search are described below.

For system search, the NAS selects the most preferred PLMN from which to receive service. The NAS may form a list of PLMNs to search for service. This search list may include PLMNs from the preferred list provisioned for the terminal and possibly PLMNs from the available list maintained by the terminal. The PLMNs in the search list may be assigned different priorities. The terminal may keep track of a registered PLMN, which is the PLMN that the terminal has registered with most recently. The registered PLMN may be given the highest priority, the home PLMN may be given the next highest priority, the preferred PLMNs may be assigned different priorities (e.g., by the service provider), and the available PLMNs may also be given different priorities (e.g., by the NAS). The NAS may attempt to obtain service from one of the PLMNs in the search list. The NAS may also attempt to obtain limited service (e.g., for emergency calls) from any PLMN if none of the PLMNs in the search list are found.

Figure 3:
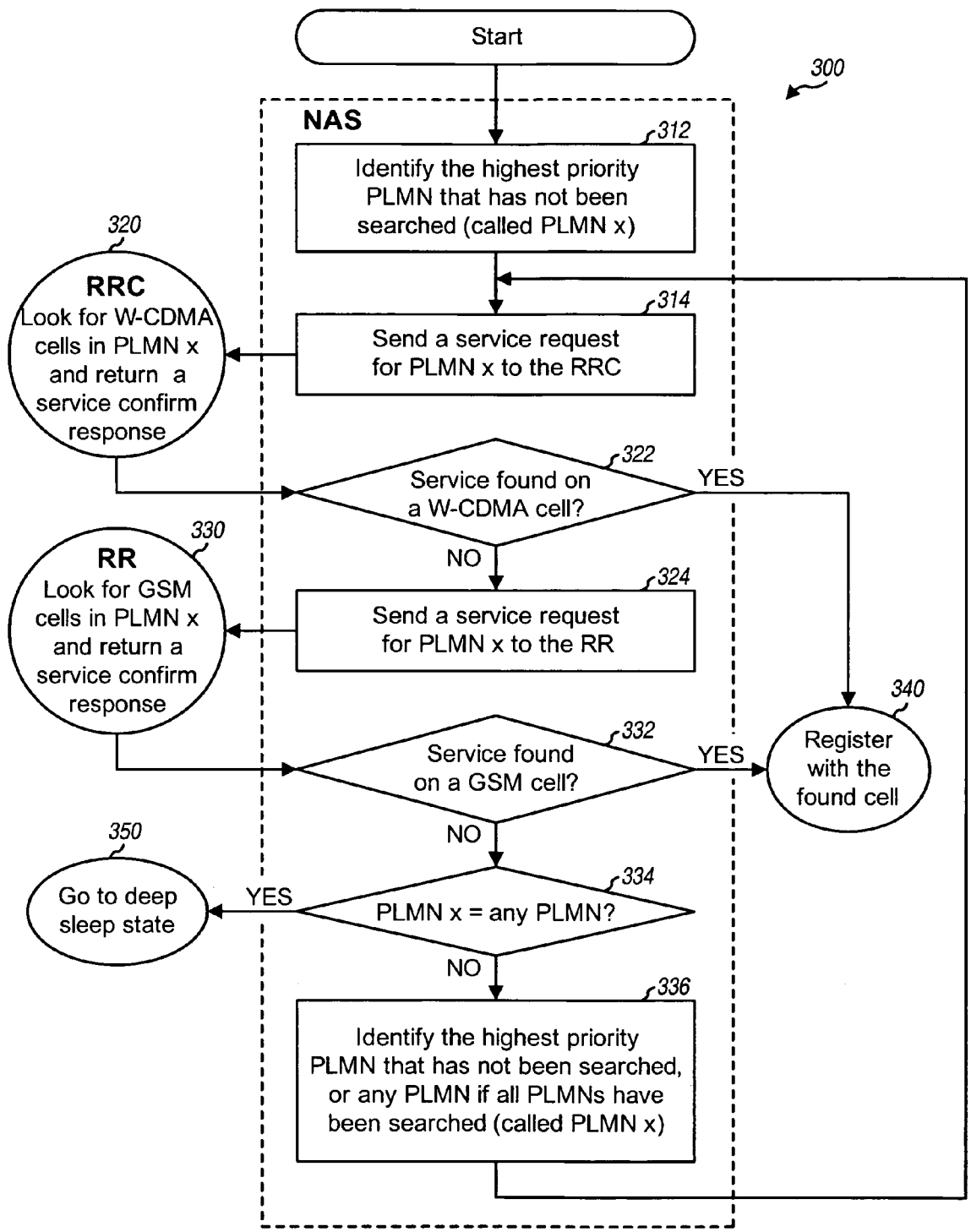
FIG. 3 shows a process performed by Non Access Stratum (NAS) to obtain service from a wireless network.

FIG. 3 shows an embodiment of a process 300 performed by the NAS to obtain service from a wireless network. Process 300 may be performed when the terminal is first powered on or upon loss of service. For process 300, the PLMNs in the search list are considered one at a time, starting with the highest priority PLMN, until service is found on a suitable PLMN.

Initially, the NAS identifies the highest priority PLMN in the search list that has not been searched, which is called PLMN x (block 312). If all PLMNs in the search list have been searched, then the NAS may indicate that PLMN x can be any PLMN. The NAS then sends a service request for PLMN x to the RRC for W-CDMA (block 314). The RRC attempts to acquire a W-CDMA cell in PLMN x and sends to the NAS a service confirm response that indicates whether or not a W-CDMA cell was found (block 320). The NAS receives the service confirm response from the RRC and determines whether service was found on a W-CDMA cell by the RRC (block 322). If the answer is 'Yes', then the NAS registers with the W-CDMA cell (block 340).

If service was not found on a W-CDMA cell by the RRC, then the NAS sends a service request for PLMN x to the RR for GSM (block 324). The RR attempts to acquire a GSM cell in PLMN x and sends to the NAS a service confirm response that indicates whether or not a GSM cell was found (block 330). The NAS receives the service confirm response from the RR and determines whether service was found on a GSM cell by the RR (block 332). If the answer is 'Yes', then the NAS registers with the GSM cell (block 340). Otherwise, if service was not found on a GSM cell by the RR, then the NAS determines whether PLMN x was for any PLMN (block 334). If the answer is 'No', then the NAS identifies the next highest priority PLMN in the search list that has not been searched, which is called PLMN x (block 336). If all PLMNs in the search list have been searched, then the NAS indicates that PLMN x can be any PLMN (also block 336). The process then returns to block 314, and the NAS sends a service request for the new PLMN x.

In block 334, if PLMN x is for any PLMN and if service was not found on a W-CDMA or GSM cell, which indicates that all PLMNs have been searched and no wireless network was found, then the NAS goes into a deep sleep state (block 350). The NAS may periodically wake up from the deep sleep state and perform system search.

FIG. 3 assumes that W-CDMA is given higher priority than GSM. Hence, the NAS first sends the service request for PLMN x to the RRC, and then sends the service request to the RR if service was not found on a W-CDMA cell. If GSM is given higher priority than W-CDMA, then the NAS would send the service request to the RR first (instead of the RRC) and would then send the service request to the RRC if service was not found on a GSM cell.

The RRC performs a number of functions to process a service request from the NAS and to search for W-CDMA networks. In an embodiment, the RRC performs the following functions:

Maintain a list of W-CDMA networks found in prior system searches;

Maintain and associate channel numbers for the found W-CDMA networks;

Determine which frequencies to scan for each W-CDMA band of interest; and

Determine when to perform frequency scan for W-CDMA.

The RRC may maintain an acquisition database that contains various types of information used to acquire W-CDMA networks. For example, the acquisition database may contain a list of W-CDMA networks that have been found in prior system searches. The acquisition database may store one or more channel numbers for each W-CDMA network in the list. Each channel number is for a specific W-CDMA RF channel and indicates a specific W-CDMA carrier frequency. Each W-CDMA network in the list corresponds to a PLMN with W-CDMA coverage. Each unique combination of channel number and PLMN may be stored as a separate entry in the acquisition database. The entries in the acquisition database may be sorted in chronological order, starting with the most recently used channel number and PLMN combination.

The RRC also determines when to perform frequency scan, which W-CDMA band to scan (which may be provided by the NAS), and which frequencies to scan for each W-CDMA band of interest. It may be preferable to obtain service from a W-CDMA network. Nevertheless, it is desirable to obtain service from any network, either W-CDMA or GSM, as quickly as possible. A frequency scan for W-CDMA may take a long time. Thus, the terminal may first attempt to obtain service from a GSM network before performing a frequency scan for W-CDMA. A GSM search may be performed to look for service from a GSM network. This GSM search may take a shorter amount of time than a W-CDMA frequency scan. Furthermore, the information obtained from the GSM search may be used to limit the frequencies for the W-CDMA frequency scan, so that frequencies in which W-CDMA networks are unlikely to be found are not scanned.

Figure 4A:
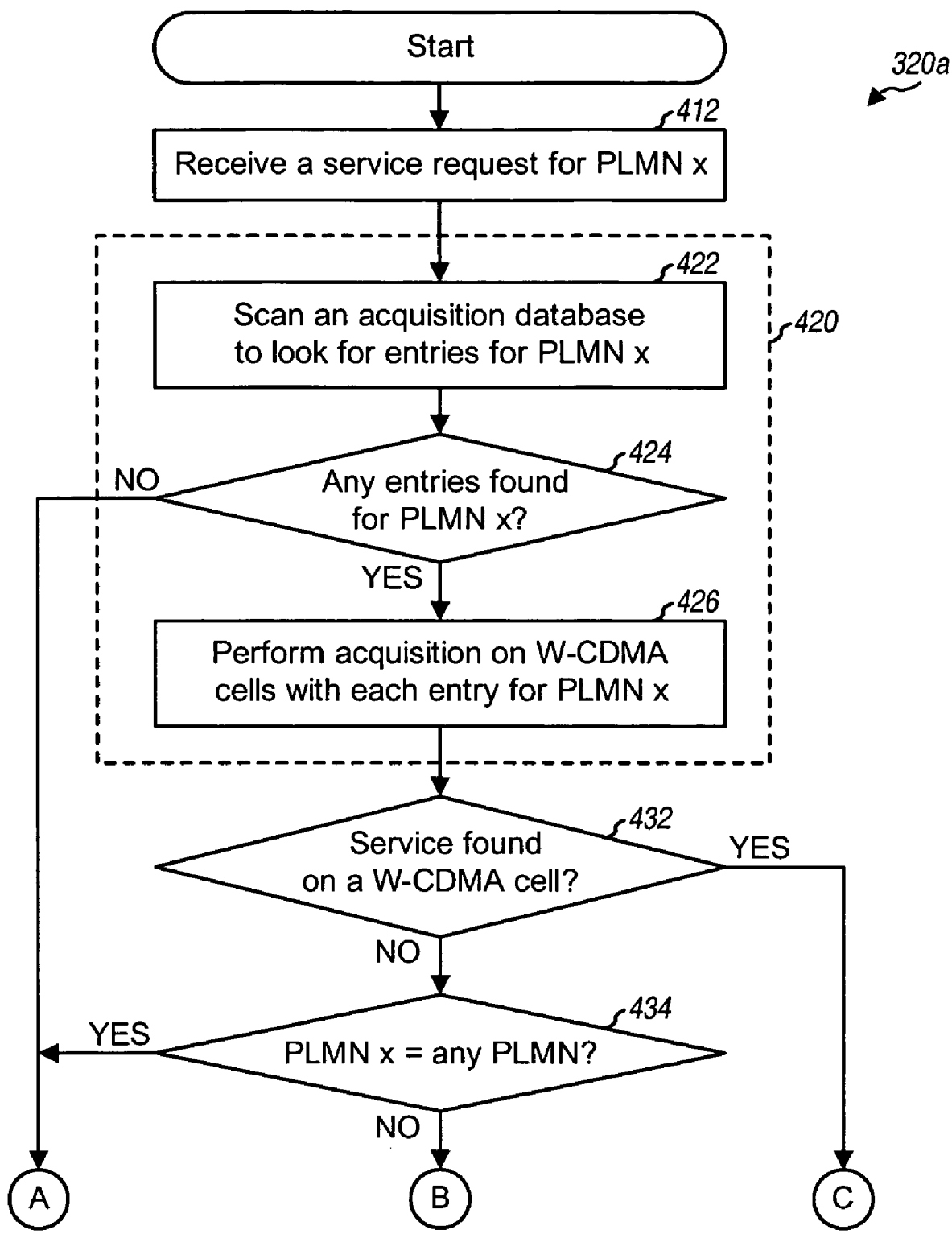
FIGS. 4A and 4B show a process performed by Radio Resource Control (RRC) for a service request from the NAS.
Figure 4B:
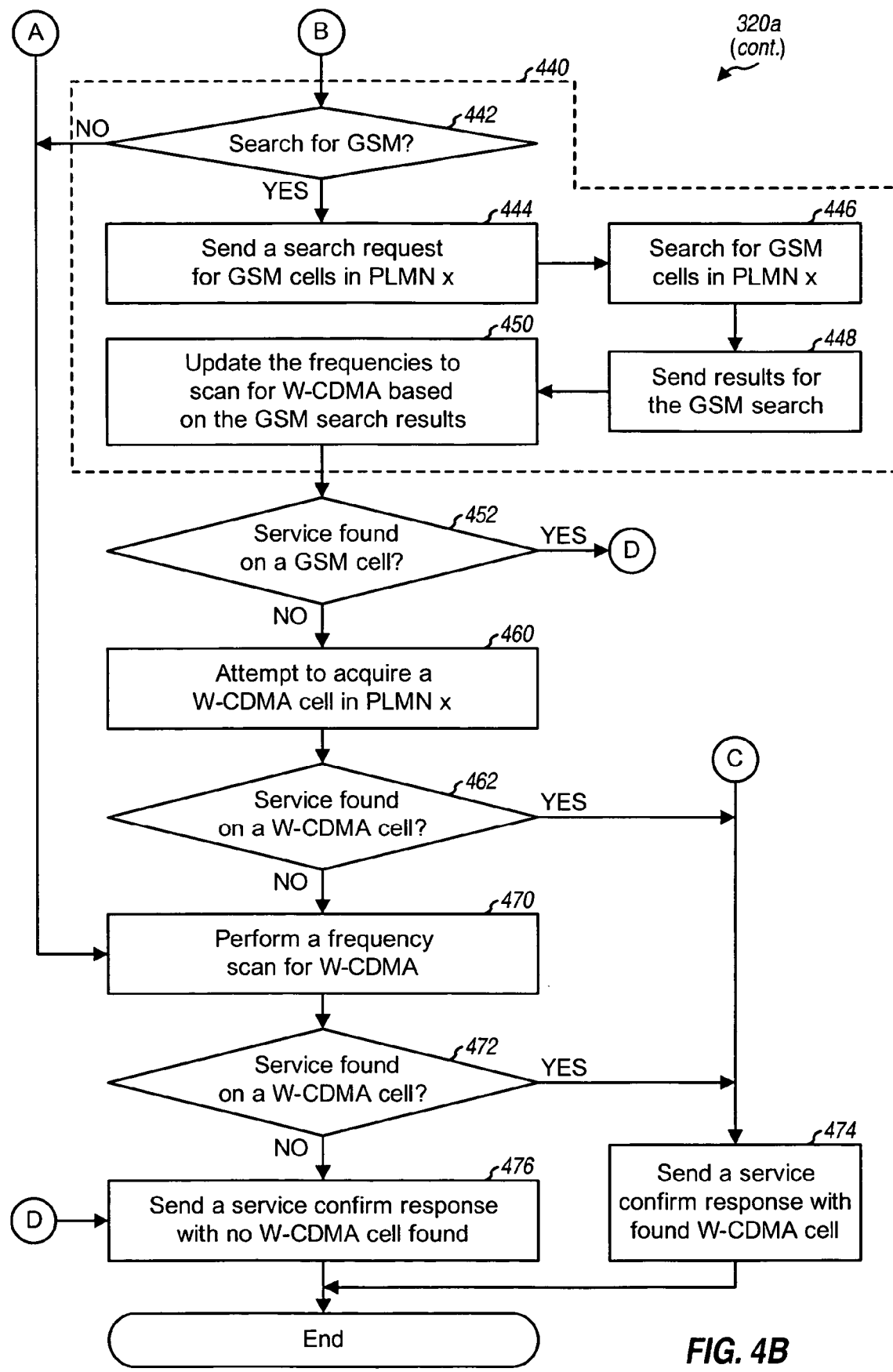

FIGS. 4A and 4B show an embodiment of a process 320a performed by the RRC for a service request from the NAS. Process 320a is an embodiment of block 320 in FIG. 3. Initially, the RRC receives a service request for PLMN x from the NAS (block 412).

The RRC then attempts to acquire a W-CDMA cell in PLMN x (block 420). For block 420, the RRC scans the acquisition database to look for entries for PLMN x and possibly for entries for PLMNs that are considered to be equivalent to PLMN x (block 422). The acquisition database includes an entry for each W-CDMA carrier frequency previously detected for PLMN x. The acquisition database may not have any entry for PLMN x if the terminal is new and powered on for the first time or if the terminal has just been upgraded with one or more new PLMNs. A determination is then made whether any entries for PLMN x are found in the acquisition database (block 424). If the answer is 'No', then the RRC may perform a frequency scan (block 470 in FIG. 4B). Alternatively, the RRC may skip the frequency scan at this point and may send a service confirm response indicating that no W-CDMA cell was found (not shown in FIG. 4A). The NAS can then consider the next lower priority PLMN.

If at least one entry was found for PLMN x and the answer is 'Yes' for block 424, then the RRC determines the channel number for each entry and directs Layer 1 to attempt acquisition on W-CDMA cells for each channel number (block 426). The RRC may attempt acquisition on one channel number at a time, starting with the most recently acquired channel number. Acquisition for W-CDMA may entail (1) searching an entire scrambling code space to look for a common pilot channel (CPICH) transmitted by W-CDMA cells and (2) decoding a primary common control physical channel (PC-CPCH) to obtain overhead information for the W-CDMA cells.

After completing the acquisition attempt in block 426, a determination is made whether service was found on a W-CDMA cell in PLMN x (block 432). If the answer is 'Yes', then the RRC sends to the NAS a service confirm response with the found W-CDMA cell (block 474 in FIG. 4B). Otherwise, if service was not found on a W-CDMA cell, then a determination is made whether PLMN x is for any PLMN (block 434). If the answer is 'Yes', which means that all PLMNs in the search list have been searched and no W-CDMA cell was found, then the RRC performs a frequency scan (block 470).

In an embodiment, if service was obtained from a W-CDMA network in PLMN x in the past (which is indicated by a 'Yes' for block 424) and if service was not found on a W-CDMA network in PLMN x in the current system search (which is indicated by a 'No' for block 432), then the RRC initiates GSM search prior to performing a W-CDMA frequency scan (block 440 in FIG. 4B). In another embodiment, the RRC initiates GSM search if acquisition has been attempted with all entries in the acquisition database and service was not found any W-CDMA cell. The GSM search may also be triggered based on other criteria. The GSM search may be performed for PLMN x (as shown in FIG. 4B) and/or some other PLMN.

In an embodiment, the GSM search is performed for crowded frequency bands such as, e.g., W-CDMA Bands II and III that correspond to GSM 1900 and GSM 1800, respectively. A W-CDMA frequency scan may take a long time for a crowded frequency band. This is because signals from other networks result in high received power measurements that trigger code space searches for W-CDMA cells. A GSM search may be performed in a shorter amount of time than a W-CDMA frequency scan for a crowded frequency band. Furthermore, for a PLMN in which W-CDMA coverage has been detected in the past, the likelihood of finding GSM coverage in the same PLMN may be high. Hence, for crowded frequency bands, improved performance (e.g., faster time to obtain service) may be achieved by performing a GSM search prior to performing a W-CDMA frequency scan.

Within block 440, a determination is made whether to perform a GSM search (block 442). PLMN x may include one or more W-CDMA networks that operate on one or more W-CDMA bands, which may be provided by the NAS to the RRC. Block 442 may determine whether any of the W-CDMA band(s) for PLMN x is a crowded frequency band. If the answer is 'No' for block 442, then the RRC performs a frequency scan (block 470). Otherwise, if a GSM search is to be performed, then the RRC determines the GSM band corresponding to each W-CDMA band for PLMN x. For example, if PLMN x is associated with W-CDMA Bands II and III, then the RRC provides the corresponding GSM 1900 and GSM 1800. The RRC then sends to the RR a search request for the corresponding GSM band(s) for PLMN x (block 444). The RR searches the corresponding GSM band (s) for GSM cells in PLMN x (block 446). The GSM search may entail (1) measuring received power for each RF channel in each GSM band and, for each RF channel with sufficiently strong received power, (2) detecting a tone on a frequency correction channel (FCCH), and (3) decoding a synchronization channel (SCH) to obtain a transceiver station identity code (BSIC) for a GSM cell. Upon completing the GSM search, the RR sends the search results to the RRC (block 448). The search results may include a list of RF channels for which the BSIC was detected. The RRC receives the search results from the RR and updates the frequencies to scan for each W-CDMA band, as described below (block 450).

A determination is then made whether service was found on a GSM cell in PLMN x (block 452). If the answer is 'Yes', then the RRC avoids a frequency scan for W-CDMA since service may be obtained more quickly from the GSM cell. The RRC then sends to the NAS a service confirm response indicating that no W-CDMA cell was found for PLMN x (block 476). The NAS would subsequently attempt to acquire service from the GSM cell found by the RR during the GSM search, in block 324 of FIG. 3.

If service was not found on a GSM cell by the GSM search and the answer is 'No' for block 452, then the RRC may once more attempt to acquire a W-CDMA cell on PLMN x (block 460). The GSM search in block 446 consumes some amount of time, and the terminal may have moved within W-CDMA coverage during this time. The acquisition attempt in block 460 may result in faster service for some operating scenarios. Block 460 may include blocks 422, 424 and 426 within block 420 in FIG. 4A. After completing the acquisition attempt in block 460, a determination is made whether service was found on a W-CDMA cell in PLMN x (block 462). If the answer is 'Yes', then the RRC sends to the NAS a service confirm response with the found W-CDMA cell (block 474). Otherwise, if service was not found on a W-CDMA cell, then the RRC performs a frequency scan (block 470).

In block 470, a frequency scan may be performed over a subset of the frequencies for each W-CDMA band of interest to search for W-CDMA cells, as described below. Scanning a subset of the frequencies, instead of an entire W-CDMA band, may substantially reduce the amount of time for the frequency scan. After completing the frequency scan, a determination is made whether service was found on a W-CDMA cell (block 472). If the answer is 'Yes', then the RRC sends to the NAS a service confirm response with the found W-CDMA cell (block 474). Otherwise, the RRC sends to the NAS a service confirm response with no W-CDMA cell found (block 476).

Figure 5:
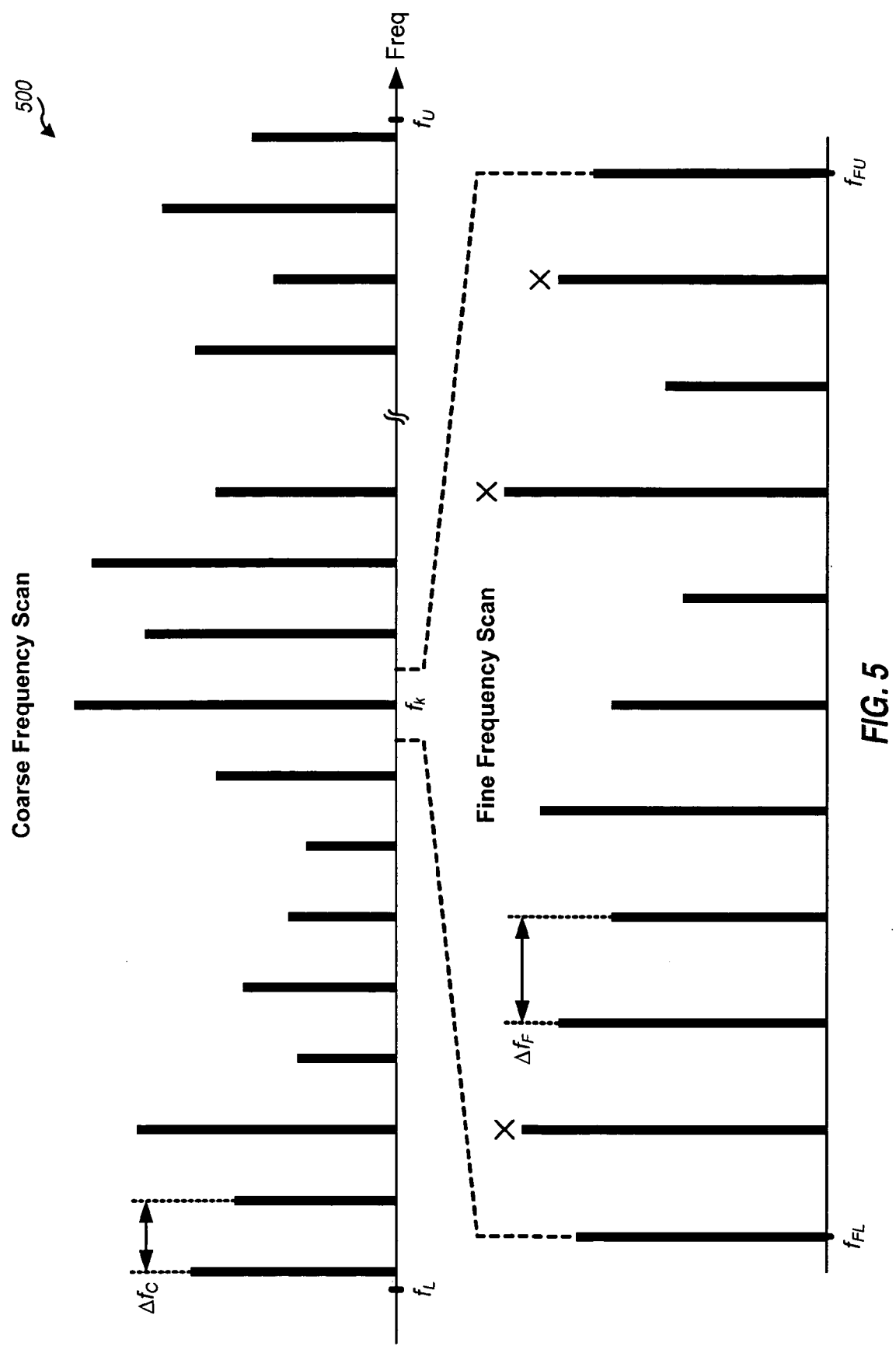
FIG. 5 shows a 2-stage frequency scan for W-CDMA.

FIG. 5 shows an exemplary 2-stage frequency scan 500 for W-CDMA, which may be performed for block 470 in FIG. 4B. In the first stage, a coarse frequency scan is performed across a W-CDMA band of interest, e.g., any one of the W-CDMA bands given in Table 1. Received power measurements are obtained for different frequencies that are spaced apart by $\Delta f_C$. For example, $\Delta f_C$ may be equal to 2 MHz, and a coarse frequency scan for W-CDMA Band II may provide 31 received power measurements for 31 coarse frequencies at $f_k=1930+2k$, for $k=0, \ldots, 30$. The received power measurements may be sorted in descending order. The sorted coarse frequencies may then be evaluated one at a time, starting with the coarse frequency having the strongest received power, until a termination condition is encountered (e.g., a suitable W-CDMA cell is found).

In the second stage, a fine frequency scan is performed for each coarse frequency being evaluated. A fine frequency scan is performed across a frequency range of $f_{FL}=f_k-\Delta f_C/2$ to $f_{FU} = f_k + \Delta f_C/2$ for coarse frequency $f_k$. Received power measurements are obtained for different fine frequencies that are spaced apart by $\Delta f_F$. For example, $\Delta f_F$ may be equal to 200 KHz, and a fine frequency scan for coarse frequency $f_k$ may provide 11 received power measurements for 11 fine frequencies at $f_{k,i} = f_k - \Delta f_F/2 + i/5$, for i=0, ..., 10. $\Delta f_F$ is the W-CDMA channel raster, which is the spacing between possible carrier frequencies for W-CDMA. The fine frequencies thus correspond to the possible W-CDMA carrier frequencies. The received power measurements for the fine frequencies may be sorted in descending order. W-CDMA acquisition may then be attempted on the sorted fine frequencies, one fine frequency at a time and starting with the fine frequency having the strongest received power, until a termination condition is encountered (e.g., a suitable W-CDMA cell is found).

As shown in FIG. 5, there may be many carrier frequencies to attempt W-CDMA acquisition. As an example, W-CDMA Band II covers 301 carrier frequencies, and W-CDMA acquisition may be attempted on as many as 200 to 300 carrier frequencies for this W-CDMA band. Consequently, the frequency scan for W-CDMA may take a long time (e.g., 2 to 3 minutes) to complete.

In an embodiment, the RRC performs a frequency scan for W-CDMA using information for GSM in order to expedite the frequency scan. The RRC may obtain a list of GSM RF channels found by the RR and may use this list to remove W-CDMA carrier frequencies. In an embodiment, the RRC removes the W-CDMA carrier frequency corresponding to each RF channel found by the RR. For the example shown in FIG. 5, the second, eighth and tenth fine frequencies (which are marked with "x") correspond to RF channels found by the RR. The RRC may then skip acquisition on these omitted W-CDMA carrier frequencies.

In another embodiment, the RRC removes L W-CDMA carrier frequencies centered at each RF channel found by the RR. A W-CDMA channel with a bandwidth of 3.84 MHz covers 19 W-CDMA carrier frequencies. The RRC may remove 9 W-CDMA carrier frequencies on each of the two sides of each RF channel found by the RR. In another embodiment, W-CDMA carrier frequencies around previously acquired W-CDMA carrier frequencies are removed.

In an embodiment, Layer 1 attempts acquisition once for each W-CDMA carrier frequency of interest. Each acquisition attempt may entail searching over the entire scrambling code space to look for W-CDMA cells. Layer 1 may attempt acquisition multiple times to improve the likelihood of acquiring a W-CDMA cell. However, increasing the number of acquisition attempts can extend the time required to perform a frequency scan. One acquisition attempt may provide good acquisition performance while reducing the frequency scan time.

Figure 6:
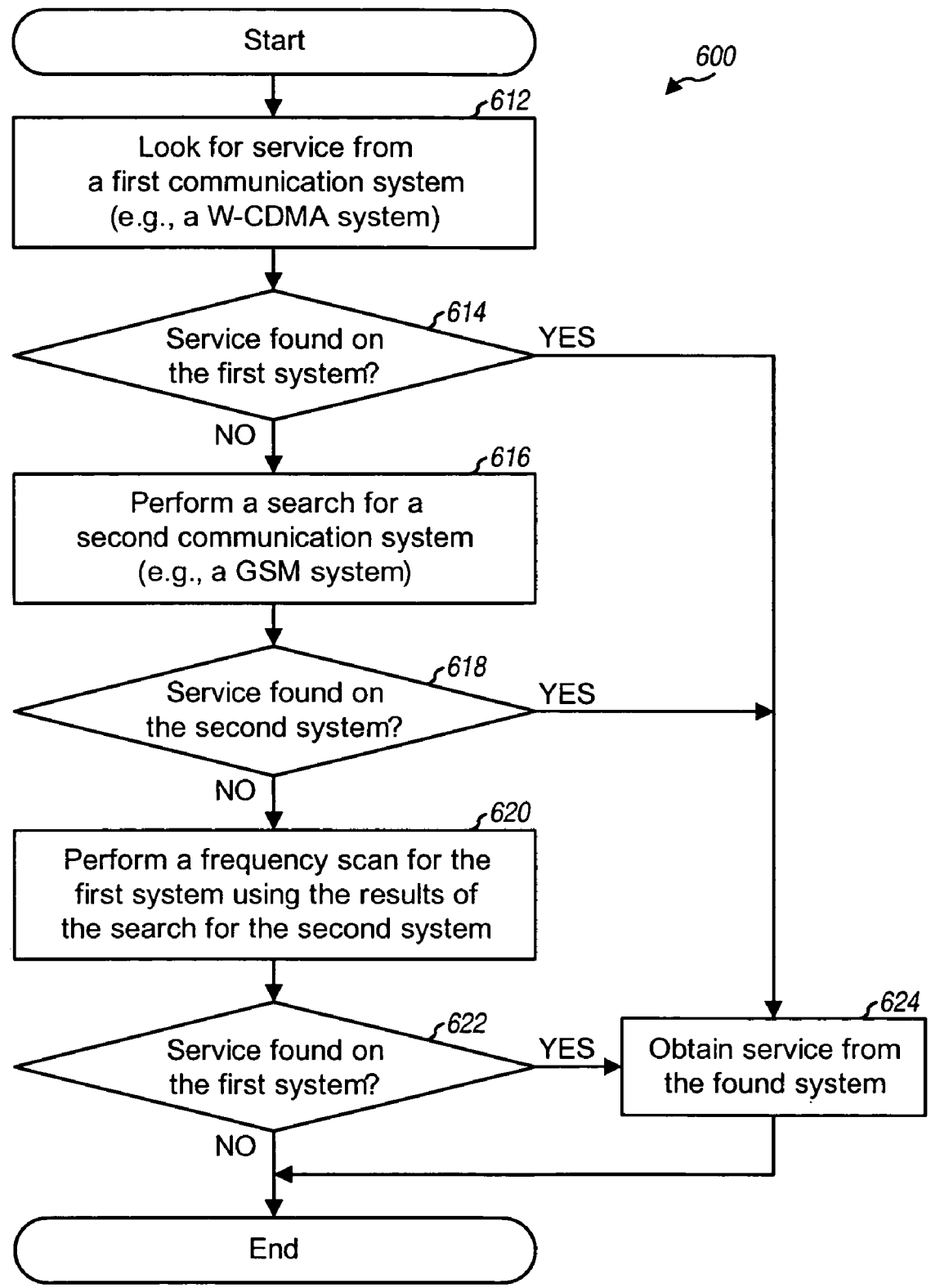
FIG. 6 shows a process performed by a terminal to obtain service.

FIG. 6 shows an embodiment of a process 600 performed by a terminal to obtain service. Initially, the terminal looks for service from a first communication system (e.g., a W-CDMA system) (block 612). The terminal may form a list of one or more networks in the first system, which are network(s) from which the terminal has received service in the past. The terminal may perform acquisition on each network in the list to look for service from the first system.

If service was found on the first system, as determined in block 614, then the terminal obtains service from the first system (block 624). Otherwise, if service was not found on the first system, then the terminal performs a search for a second communication system (e.g., a GSM system) (block 616). The terminal may condition the search for the second system based on various criteria such as, e.g., if the first system is operating on a designated frequency band, which may be a crowded frequency band such as PCS band. The terminal may perform the search for the second system for one or more frequency bands (e.g., GSM 1900) corresponding to one or more frequency bands (e.g., Band II) for the first system.

If service was found on the second system, as determined in block 618, then the terminal obtains service from the second system (block 624). Otherwise, the terminal performs a frequency scan for the first system using the results of the search for the second system (block 620). The terminal may obtain a list of RF channels detected for the second system and may omit these RF channels from the frequency scan for the first system. The terminal may also determine one or more frequency regions for which frequency scan is not needed based on the list of RF channels and may then omit the frequency region(s) from the frequency scan for the first system. If service was found on the first system, as determined in block 622, then the terminal obtains service from the first system (block 624). Otherwise, the terminal may go to sleep and may perform system search again at a later time.

Figure 7:
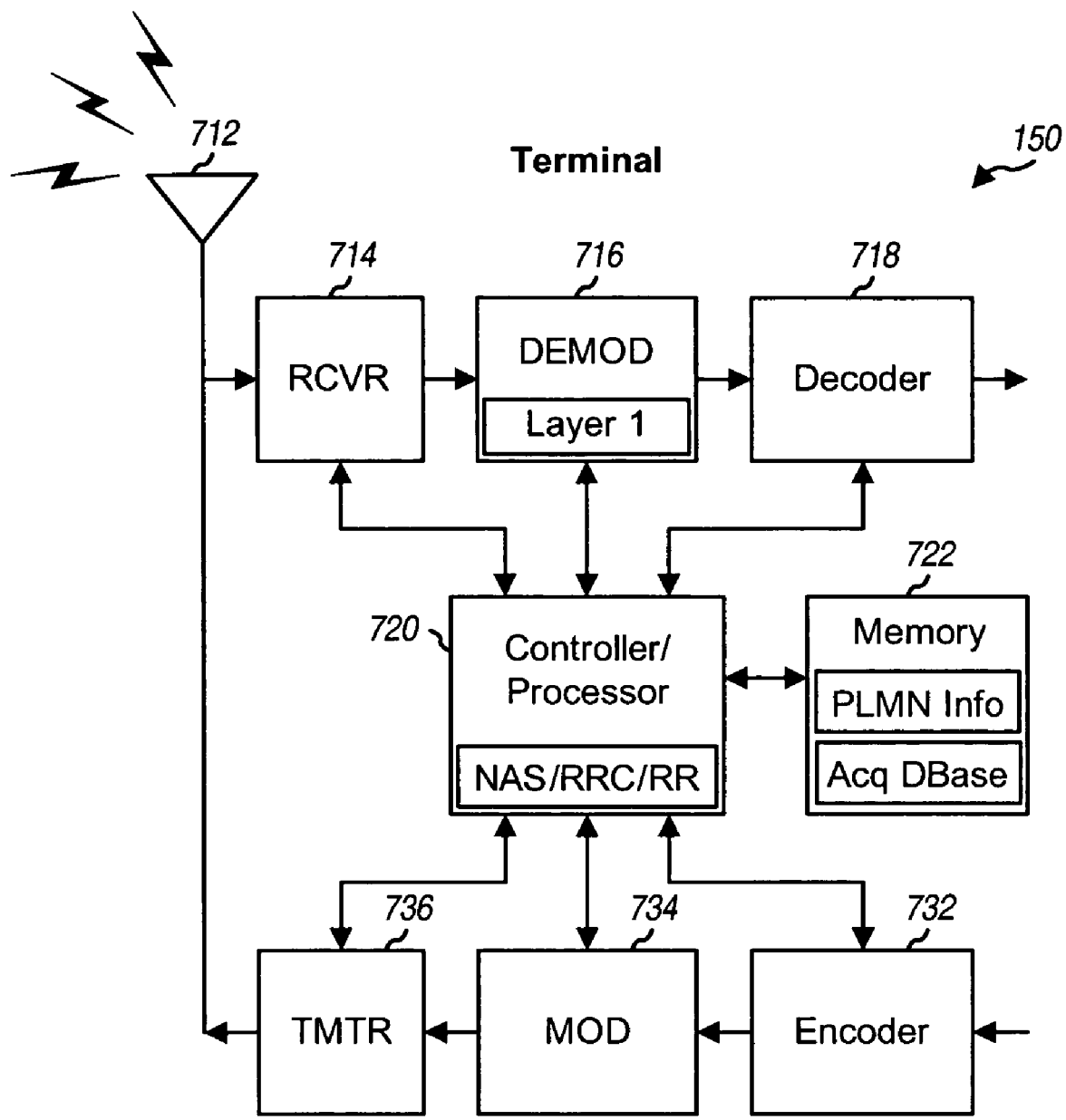
FIG. 7 shows a block diagram of the terminal.

FIG. 7 shows a block diagram of an embodiment of terminal 150. On the downlink, an antenna 712 receives modulated signals from GSM and/or W-CDMA base stations and provides a received signal to a receiver (RCVR) 714. Receiver 714 conditions (e.g., filters, amplifies, and frequency downconverts) the received signal, digitizes the conditioned signal, and provides data samples. A demodulator (DEMOD) 716 processes (e.g., descrambles, dechannelizes, and demodulates) the data samples and provides symbol estimates, which are estimates of data symbols sent by a base station for terminal 150. A decoder 718 then processes (e.g., deinterleaves and decodes) the symbol estimates and provides decoded data for terminal 150. The processing by demodulator 716 and decoder 718 is typically different for different radio access technologies. For example, demodulator 716 may perform matched filtering and equalization for GSM. Demodulator 716 may perform descrambling with scrambling sequences, despreading with orthogonal variable spreading factor (OVSF) codes, data demodulation, and so on, for W-CDMA.

On the uplink, traffic data and signaling to be sent by terminal 150 is processed (e.g., encoded and interleaved) by an encoder 732 and further processed (e.g., modulated, channelized, and scrambled) by a modulator (MOD) 734 in accordance with the applicable radio access technology (e.g., GSM or W-CDMA). A transmitter (TMTR) 736 conditions (e.g., converts to analog, amplifies, filters, and frequency upconverts) the data chips from modulator 734 and generates an uplink signal, which is transmitted via antenna 712 to one or more base stations.

A controller/processor 720 controls the operation at terminal 150. A memory 722 store data and program codes for terminal 150.

For system search, controller/processor 720 may implement process 300 in FIG. 3, process 320a in FIGS. 4A and 4B, process 600 in FIG. 6, and/or some other processes. Controller/processor 720 may implement the NAS and may determine when to perform system search, which PLMNs to look for service, and so on. Controller/processor 720 may also implement the RRC and may determine when to invoke GSM search, when to perform frequency scan, and which frequencies to scan. Controller/processor 720 may also implement the RR and may perform the GSM search whenever directed by the RRC and RR. Demodulator 716 may implement Layer 1 for both W-CDMA and GSM, perform acquisition for W-CDMA whenever directed by the RRC, provide W-CDMA acquisition results, perform GSM search whenever directed by the RR, and provide GSM search results.

For clarity, the system search techniques have been specifically described for W-CDMA and GSM. These techniques may also be used for other systems such as cdma2000 system, wireless local area network (WLAN) system, and so on. These technique may also be used for more than two systems, e.g., for W-CDMA, GSM and cdma2000 systems.

The system search techniques described herein may be implemented by various means. For example, these techniques may be implemented in hardware, firmware, software, or a combination thereof. For a hardware implementation, the processing units used to perform system search may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 722 in FIG. 7) and executed by a processor (e.g., processor 720). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to look for service from a first communication system by scanning for one or more networks in the first communication system from which service was received previously, to perform a search for a second communication system if service is not found on the first communication system, wherein the second communication system has a shorter search time than the first communication system, and to perform a frequency scan for the first communication system, the frequency scan for the first communication system omitting channels on which a signal satisfying a predetermined criterion was detected during the search for the second communication system, wherein the frequency scan comprises a coarse frequency scan and a fine frequency scan; and
a memory coupled to the at least one processor.

2. The apparatus of claim 1, wherein the memory is configured to store networks in the first communication system from which service was received previously.

3. The apparatus of claim 1, wherein the at least one processor is configured to perform the frequency scan for the first communication system if service is not found for the second system during the search for the second communication system.

4. The apparatus of claim 1, wherein the at least one processor is configured to obtain a list of radio frequency (RF) channels detected for the second communication system during the search for the second communication system, and to omit the list of RF channels from the frequency scan for the first communication system.

5. The apparatus of claim 1, wherein the at least one processor is configured to obtain a list of radio frequency (RF) channels detected for the second communication system during the search for the second communication system, to determine at least one frequency region based on the list of RF channels, and to omit the at least one frequency region from the frequency scan for the first communication system.

6. The apparatus of claim 1, wherein the at least one processor is configured to look for service from the first communication system again after performing the search for the second communication system and prior to performing the frequency scan for the first communication system.

7. The apparatus of claim 1, wherein the at least one processor is configured to identify at least one network in the first communication system, to look for service from the at least one network, and to perform the search for the second communication system if service was not found on any one of the at least one network.

8. The apparatus of claim 7, wherein the at least one network comprises networks in the first communication system from which service was received previously.

9. The apparatus of claim 1, wherein the at least one processor is configured to perform the search for the second communication system if service was not found for the first system and the first system is operating on a designated frequency band.

10. The apparatus of claim 9, wherein the designated frequency band is a crowded frequency band on which multiple communication systems operate.

11. The apparatus of claim 1, wherein the at least one processor is configured to identify one or more frequency bands for the first communication system, and to perform the search for the second communication system for at least one frequency band corresponding to the one or more frequency bands for the first communication system.

12. The apparatus of claim 1, wherein the first communication system is a Wideband Code Division Multiple Access (W-CDMA) system, and wherein the second communication system is a Global System for Mobile Communications (GSM) system.

13. An apparatus comprising:
at least one processor configured to look for service from a Wideband Code Division Multiple Access (W-CDMA) system by scanning for one or more networks in the first communication system from which service was received previously, to perform a search for a Global System for Mobile Communications (GSM) system if service was not found for the W-CDMA system, wherein the GSM system has a shorter search time than the W-CDMA system, and to perform a frequency scan for the W-CDMA system, the frequency scan for the W-CDMA system omitting channels on which a signal satisfying a predetermined criterion was detected during the search for the GSM system, wherein the frequency scan comprises a coarse frequency scan and a fine frequency scan; and
a memory coupled to the at least one processor.

14. The apparatus of claim 13, wherein the at least one processor is configured to identify at least one W-CDMA network for the W-CDMA system, to look for service from the at least one W-CDMA network, and to perform the search for the GSM system if service was not found on any one of the at least one W-CDMA network.

15. The apparatus of claim 13, wherein the at least one processor is configured to obtain a list of radio frequency (RF) channels detected for the GSM system during the search for the GSM system, and to omit the list of RF channels from the frequency scan for the W-CDMA system.

16. A method comprising:
performing acquisition for a first communication system to look for service from the first communication system by scanning for one or more networks in the first communication system from which service was received previously;
performing a search for a second communication system if service was not found for the first communication system, wherein the second communication system has a shorter search time than the first communication system; and
performing a frequency scan for the first communication system, the frequency scan for the first system omitting channels on which a signal satisfying a predetermined criterion was detected during the search for the second communication system, wherein the frequency scan comprises a coarse frequency scan and a fine frequency scan.

17. The method of claim 16, wherein performing acquisition for the first communication system comprises
identifying at least one network in the first communication system, and
performing acquisition for the at least one network to look for service from the first communication system, and wherein the search for the second communication system is performed if service was not found on any one of the at least one network.

18. The method of claim 16, wherein performing the search for the second communication system comprises performing the search for the second communication system if service was not found for the first communication system and the first communication system is operating on a designated frequency band.

19. The method of claim 16, wherein performing the frequency scan for the first communication system comprises:
performing the frequency scan for the first communication system if service was not found for the second communication system during the search for the second system.

20. The method of claim 16, wherein the performing the frequency scan for the first communication system comprises:
obtaining a list of radio frequency (RF) channels detected for the second communication system during the search for the second communication system, and omitting the list of RF channels from the frequency scan for the first communication system.

21. An apparatus comprising:
means for performing acquisition for a first communication system to look for service from the first communication system by scanning for one or more networks in the first communication system from which service was received previously;
means for performing a search for a second communication system if service was not found for the first communication system, wherein the second communication system has a shorter search time than the first communication system; and
means for performing a frequency scan for the first communication system, the frequency scan for the first communication system omitting channels on which a signal satisfying a predetermined criterion was detected during the search for the second communication system, wherein the frequency scan comprises a coarse frequency scan and a fine frequency scan.

22. The apparatus of claim 21, wherein the means for performing acquisition for the first communication system comprises:
means for identifying at least one network in the first communication system, and
means for performing acquisition for the at least one network to look for service from the first communication system, and
wherein the search for the second communication system is performed if service was not found on any one of the at least one network.

23. The apparatus of claim 21, wherein the means for performing the search for the second communication system comprises:
means for performing the search for the second communication system if service was not found for the first communication system and the first communication system is operating on a designated frequency band.

24. The apparatus of claim 21, wherein the means for performing the frequency scan for the first communication system comprises:
means for performing the frequency scan for the first communication system if service was not found for the second communication system during the search for the second communication system.

25. The apparatus of claim 21, wherein the means for performing the frequency scan for the first communication system comprises:
means for obtaining a list of radio frequency (RF) channels detected for the second system communication during the search for the second communication system, and
means for omitting the list of RF channels from the frequency scan for the first system.

26. A non-transitory processor readable media for storing instructions operable in a wireless device to:
perform acquisition for a first communication system to look for service from the first communication system by scanning for one or more networks in the first communication system from which service was received previously;
perform a search for a second communication system if service was not found for the first communication system, wherein the second communication system has a shorter search time than the first communication system; and
perform a frequency scan for the first communication system, the frequency scan for the first communication system omitting channels on which a signal satisfying a predetermined criterion was detected during the search for the second communication system, wherein the frequency scan comprises a coarse frequency scan and a fine frequency scan.

27. The processor readable media of claim 26, and further for storing instructions operable to:
identify at least one network in the first communication system, and
perform acquisition for the at least one network to look for service from the first communication system, and wherein the search for the second communication system is performed if service was not found on any one of the at least one network.

28. The processor readable media of claim 26, and further for storing instructions operable to:
perform the search for the second communication system if service was not found for the first communication system and the first communication system is operating on a designated frequency band.

29. The processor readable media of claim 26, and further for storing instructions operable to:
perform the frequency scan for the first communication system if service was not found for the second communication system during the search for the second communication system.

30. The processor readable media of claim 26, and further for storing instructions operable to:
obtain a list of radio frequency (RF) channels detected for the second communication system during the search for the second communication system, and
omit the list of RF channels from the frequency scan for the first communication system.

31. The apparatus of claim 1, wherein the predetermined criterion comprises having a received power greater than a predetermined threshold or having a decodable identifier.

32. The apparatus of claim 31, wherein the decodable identifier identifies at least one of a network, a base station, or a communication system type.

33. The apparatus of claim 13, wherein the predetermined criterion comprises having a received power greater than a predetermined threshold or having a decodable transceiver station identity code (BSIC).

34. The method of claim 16, wherein the predetermined criterion comprises having a received power greater than a predetermined threshold or having a decodable identifier.

35. The method of claim 34, wherein the decodable identifier identifies at least one of a network, a base station, or a communication system type.

* * * * *